(12) United States Patent
Topaltzas et al.

(10) Patent No.: US 9,288,695 B2
(45) Date of Patent: Mar. 15, 2016

(54) SYSTEM, METHOD AND DEVICE FOR TESTING MOBILE TELEPHONE CALL PERFORMANCE

(75) Inventors: Dimitrios M. Topaltzas, Ellicott City, MD (US); Jeffrey P. Homer, Leesburg, VA (US)

(73) Assignee: Spirent Communications, Inc., Sunnyvale, CA (US)

( * ) Notice: Subject to any disclaimer, the term of this patent is extended or adjusted under 35 U.S.C. 154(b) by 0 days.

(21) Appl. No.: 13/283,483

(22) Filed: Oct. 27, 2011

(65) Prior Publication Data

US 2012/0040645 A1 Feb. 16, 2012

Related U.S. Application Data

(63) Continuation of application No. 12/486,357, filed on Jun. 17, 2009, now Pat. No. 8,064,900.

(51) Int. Cl.
*H04W 24/00* (2009.01)
*H04W 24/06* (2009.01)

(52) U.S. Cl.
CPC ..................... *H04W 24/06* (2013.01)

(58) Field of Classification Search
USPC ................. 455/423–425, 67.11, 115.1, 226.1; 379/1.01–35
See application file for complete search history.

(56) References Cited

U.S. PATENT DOCUMENTS

| 5,446,492 | A | 8/1995 | Wolf |
| 5,910,977 | A * | 6/1999 | Torregrossa ............... 379/27.01 |
| 6,690,923 | B1 | 2/2004 | Ortiz |
| 6,721,541 | B1 | 4/2004 | Kingsley |
| 6,745,011 | B1 | 6/2004 | Hendrickson |
| 6,754,470 | B2 | 6/2004 | Hendrickson |
| 6,757,543 | B2 | 6/2004 | Moran |
| 7,024,161 | B1 | 4/2006 | LaMedica |
| 7,061,920 | B2 | 6/2006 | Janko |

(Continued)

FOREIGN PATENT DOCUMENTS

KR 20060030801 A 4/2006

OTHER PUBLICATIONS

Iscan Test Receiver Brochure (Feb. 2009), 1-8.

(Continued)

*Primary Examiner* — San Htun
*Assistant Examiner* — Erica Navar
(74) *Attorney, Agent, or Firm* — Haynes Beffel & Wolfeld LLP (57) ABSTRACT

A system and method of testing call performance of a plurality of mobile telephones is provided. In one embodiment the method comprises storing in a memory of a test device, data for one or more test scenarios that each comprises associated test parameters for attempting a plurality of telephone calls, causing the mobile telephone to attempt to establish a plurality of telephone calls of the test scenarios, and monitoring the plurality of telephone calls of the mobile telephone to determine test results data. The method further includes attempting and monitoring a plurality of telephone calls of the mobile telephone to determine test results data with one or more remote call servers and outputting the test results data to a remote computer system for processing to determine the number of dropped calls, call set up times, number of calls successfully initiated, number of calls having two way speech, and other data.

20 Claims, 3 Drawing Sheets

(56) References Cited

U.S. PATENT DOCUMENTS

| | | | |
|---|---|---|---|
| 7,224,968 B2 | 5/2007 | Dobson | |
| 7,248,868 B2 | 7/2007 | Snyder | |
| 7,974,635 B2 | 7/2011 | Tiedeman | |
| 8,265,619 B1* | 9/2012 | Hyde et al. | 455/424 |
| 2002/0069037 A1* | 6/2002 | Hendrickson et al. | 702/186 |
| 2002/0072358 A1* | 6/2002 | Schneider et al. | 455/423 |
| 2003/0060193 A1* | 3/2003 | Kurita | 455/423 |
| 2004/0160896 A1* | 8/2004 | Luna et al. | 370/235 |
| 2004/0266423 A1* | 12/2004 | Morikawa et al. | 455/424 |
| 2005/0271071 A1 | 12/2005 | Madhavapeddi | |
| 2006/0205397 A1 | 9/2006 | So | |
| 2006/0246889 A1 | 11/2006 | Buchhop | |
| 2007/0082663 A1 | 4/2007 | Tam | |
| 2007/0168745 A1 | 7/2007 | Alam | |
| 2007/0195707 A1 | 8/2007 | Cidon | |
| 2007/0207800 A1 | 9/2007 | Daley | |
| 2007/0291836 A1 | 12/2007 | Shi | |
| 2008/0320071 A1 | 12/2008 | Hoskins | |
| 2009/0111459 A1 | 4/2009 | Topaltzas | |
| 2009/0124250 A1 | 5/2009 | Topaltzas | |
| 2009/0305722 A1* | 12/2009 | Tiedeman et al. | 455/456.1 |
| 2010/0130195 A1* | 5/2010 | Rohaly et al. | 455/425 |

OTHER PUBLICATIONS

"Invex NxG Brochure", Invex NxG The next generation of test and measurement solutions for the wireless industry, (Apr. 2009), 1-12.

"Idrive Solutions", Idrive Solutions (May 27, 2009), 1-8.

\* cited by examiner

SYSTEM, METHOD AND DEVICE FOR TESTING MOBILE TELEPHONE CALL PERFORMANCE

CROSS-REFERENCE TO RELATED APPLICATIONS

This application is a continuation of, and claims priority to, U.S. patent application Ser. No. 12/486,357, filed Jun. 17, 2009, issued as U.S. Pat. No. 8,064,900 on Nov. 22, 2011, which is hereby incorporated by reference in its entirety for all purposes.

FIELD OF THE INVENTION

The present invention generally relates to systems, methods and devices for evaluating communication devices, and more particularly to systems, methods and devices for evaluating the call performance of mobile telephone devices.

BACKGROUND OF THE INVENTION

Mobile telephone devices have become ubiquitous in our society. Unlike conventional landline telephony services, which typically operate in a home or office and are delivered via a wire or cable and enjoy a highly consistent transmission quality, mobile telephone devices are subjected to use under varying radio environments. Wireless carriers, handset manufacturers, end users, and providers of various add-on services want the call performance of mobile telephone devices to be of the highest quality. Data relating to call performance may include data related to dropped calls, failed call initiations, call set-up times, time in no service, and calls not having two-way speech. Various factors may impact call performance, including signal strength, signal quality, environmental factors (such as weather), and network congestion.

In order to arrive at predictive indicators of call performance, individuals have performed manual testing whereby a plurality of mobile telephone devices are distributed in the market and manual placement of hundreds and even thousands of calls are placed and the disposition of each is manually noted. Such a process is tedious and time consuming. In other instances, call performance may be tested in the manner of a "census" in which the calls placed to and by mobile telephones operated by consumers are monitored. However, in such a census process, the mobile telephones are already in the market place.

There is a need to deploy systems and methods designed to provide indicators (such as predictive indicators or statistical indicators) of how a mobile telephone device may perform in the hands of consumers prior to the device being distributed in the market place. Further, there is a need to perform such testing in a cost-effective and automated manner.

To accurately evaluate call performance of a mobile telephone device, there is a need to test the device under various live network scenarios. To determine an indicator of a mobile telephone device's expected call performance in the hands of a consumer, a test may be conducted in the manner of a "survey" whereby a plurality of samples of the subject mobile telephone device are used to place and receive calls from and to a variety of locations representative of the signal strength and signal quality experienced by consumer users and calls are also placed during a variety of daily time periods representing light and heavy call congestion.

For example, it may be desirable to include mobile tests, stationary tests, and in-building tests in various locations and at various times and days, so as to encompass various live network configurations. When considering live network configuration variables, it also may be desirable to test mobile telephone call performance across networks having nodes that implement various types of wireless telephony equipment, such as base-station equipment and mobile-switch equipment. Further, there is a need to perform such testing with some degree of automation to efficiently perform the testing and limit recording errors and other human errors.

Accordingly, there is a need to implement and improve test methods pertaining to mobile telephones in a manner that more accurately correlates to the actual usage experiences of mobile telephone users. These and other needs may be addressed by one or more embodiments of the present inventions.

SUMMARY OF THE INVENTION

The present invention provides a system, method, and device for testing call performance of a plurality of mobile telephones. In one embodiment the method comprises storing in a memory of a test device, data for one or more test scenarios that each comprises associated test parameters for attempting a plurality of telephone calls, establishing a first Bluetooth connection between the test device and a first mobile telephone, and concurrently with said first Bluetooth connection, establishing a second Bluetooth connection between the test device and a second mobile telephone. The method further comprises transmitting commands to the first and second mobile telephones via the Bluetooth connections to cause the mobile telephones to attempt to establish a plurality of telephone calls of the test scenarios, and monitoring the plurality of telephone calls of the mobile telephones to determine test results data. The method further includes attempting and monitoring a plurality of telephone calls of the mobile telephones to determine test results data with one or more remote call servers and outputting the test results data to a remote computer system for processing to determine the number of dropped calls, call set up times, number of calls successfully initiated, number of calls having two way speech, and other data.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, devices, communication systems, computers, terminals, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, devices, communication systems, computers, terminals, components, techniques, data and network protocols, software products and systems, operating systems, development interfaces, and hardware are omitted so as not to obscure the description of the present invention.

As used herein, the term mobile telephone and mobile telephone device refer to any device using a wireless interface to communicate via a mobile telephone network (such as, for example, a cellular network) for the purpose of transmitting or receiving data including; voice communications, short message service (SMS, "text message") data; emails, internet protocol data; audio (e.g., radio) data; video data and the like. A cellular network is a radio network made up of a number of radio "cells," each served by at least one fixed-location transceiver known as a cell site or base station.

As used herein, the term call performance refers to one or more characteristics, parameters, or statistics pertaining to establishing, maintaining and/or terminating a communication link between a call initiating device and a call receiving device, where the communication traverses, at least in part, a mobile telephone network. Various parameters pertaining to call performance include dropped calls, failed call initiations (outbound calls), failed call terminations (inbound calls), mean and average call set-up times (time between dialing and call established), time in no service, and calls not having two-way speech (e.g., where only one call participant can hear the other). One of ordinary skill will appreciate that other measurements, characteristics, parameters and statistics also may be obtained to evaluate call performance.

The present invention provides automation of call performance tests that enable systematic and objective processes for evaluation of subject handsets with the intent to provide predictive indicators of call performance in the hands of the consumer. In addition, the test unit enables consistent connectivity to a plurality of handsets having Bluetooth® functionality and eliminates the need for wired connectivity to the device that often requires custom device drivers, which may interfere and cause a mobile telephone test to be inaccurately conducted. The system also enables verification of two-way speech between the mobile device under test and the call server.

According to an embodiment of the present invention, calls are placed to and from a multitude of mobile telephone devices with various parameters of each call being measured and stored (i.e., logged). For a given test scenario, a mobile test unit may be connected to a plurality of local mobile telephone devices via a Bluetooth connection (i.e., wirelessly) concurrently. Bluetooth is an open wireless protocol for exchanging data over short distances from fixed and mobile devices. The mobile test unit may concurrently control the placement and/or acceptance of calls by the local mobile telephone devices so that multiple mobile telephone devices may be tested concurrently. One or more call servers, which may be located remote from the local mobile telephone devices, may act as the second party for the respective telephone calls initiating and/or answering the calls of the test scenarios.

A plurality of test parameter data determine the duration, time, telephone number(s), etc. of one or more of calls for a test scenario may be provided by test personnel, or be generated automatically, and be distributed via the internet to the call server(s) and mobile test unit. The call server(s) may place calls to the mobile telephone device at specified times and for specified durations according to the test scenario. Similarly, the mobile test unit may command the local mobile telephone device to initiate calls to one or more mobile and/or fixed call servers at specified times and for specified durations according to the test scenario. Both the call server(s) and the test unit may monitor each telephone call to determine various call performance test result data. The call performance test result data of each call may be stored locally and then be transmitted from the mobile test unit and call servers to a remote server for processing (e.g., at the completion of the test) and storage in a central database. The central database may store the call performance test result data and processed test results from a plurality of tests performed at various locations pertaining to a plurality of different mobile telephone devices.

Test Environment

Figure 1:
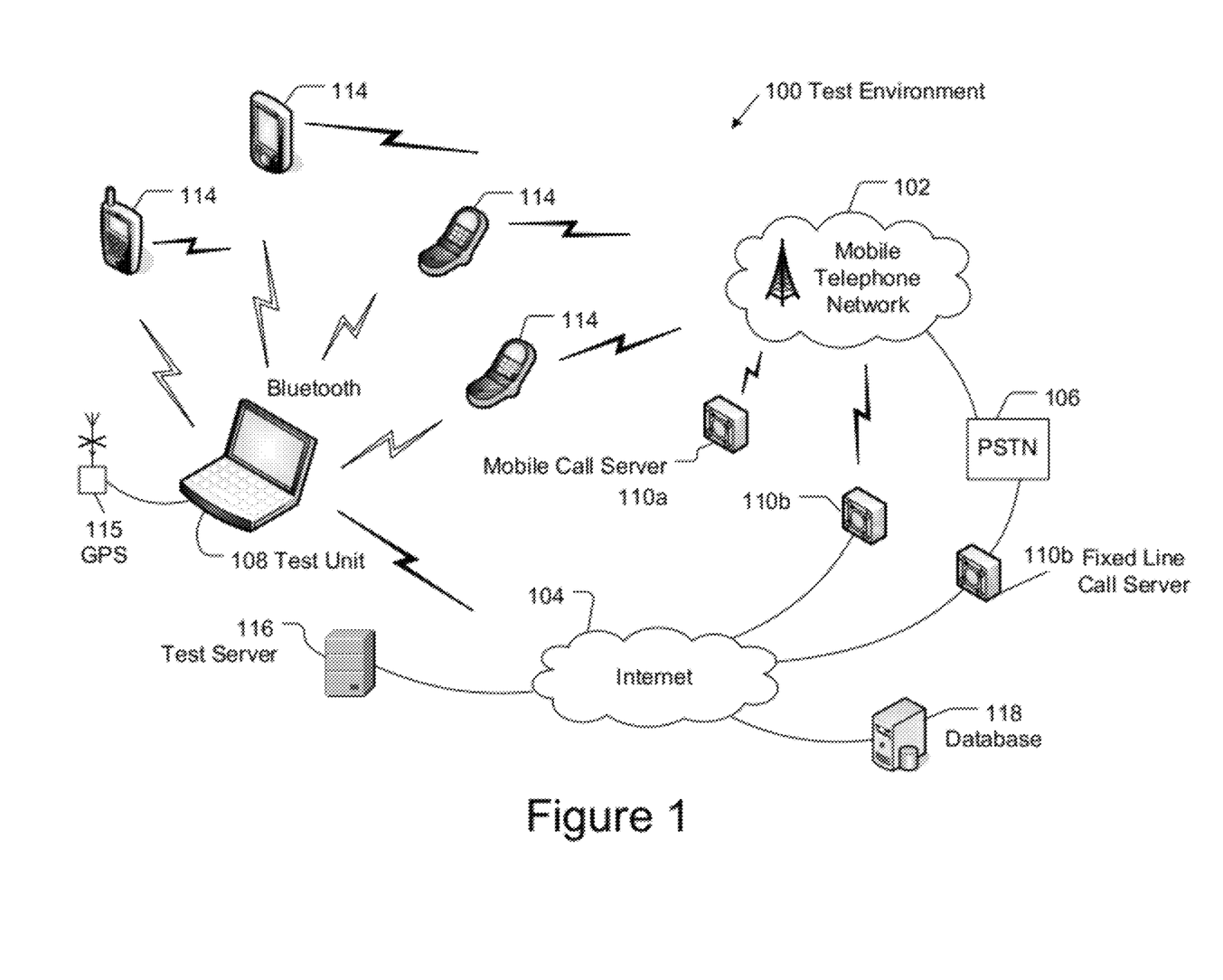
FIG. 1 is a diagram of a test system environment for testing mobile telephone call performance in accordance with an embodiment of the present invention.

FIG. 1 shows a test environment 100 according to an example embodiment of the present invention. The test environment 100 may encompass one or more communication networks, such as a mobile telephone network 102 (e.g., one or more cellular networks), the internet 104, and the public switched telephone network (PSTN) 106. The test environment 100 also may include one or more mobile test units 108, one or more mobile call servers 110a and one or more fixed line call servers 110b. In an example embodiment, the mobile test unit 108 may be a laptop computer or other portable computing device having call performance test software installed (although the test unit 108 need not take the form of a personal computer). The call performance test software may be computer program code designed to perform the functions described below with regard to the setup and implementation of call performance test methods. The mobile call server 110a and fixed line call server 110b also may be computing devices, such as computers system servers coupled to the internet.

A mobile test unit 108 connects to a plurality of mobile telephone devices 114 using the Bluetooth protocol. A peripheral Bluetooth circuit card may be installed in, or a separate Bluetooth communication device may be connected to, a portable computer forming part of the test unit 108 to facilitate the Bluetooth connection to multiple telephone devices 114. In other embodiments, a different type of personal area network (PAN) transceiver may be used instead of a Bluetooth transceiver. The mobile telephone devices 114 to be tested may connect to the mobile telephone network 102 using any of various wireless radio communication protocols, such as: Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN).

Each call server 110 may establish or maintain a link to the internet 104 by wired, wireless, or fiber-optic media as is suitable and desired for the type of call server 110. A mobile call server 110a may access the mobile telephone network 102 using any of the various radio communication protocols referenced above with regard to the mobile telephone devices 114. A fixed line server 110b may connect to the PSTN 106.

The test environment 100 also may include a test server 116 and a database storage system 118. The test server 116 may receive, transmit and store various test scenarios. For example, a test scenario that comprises a custom call sequence may be received from a mobile test unit 108 via the internet 104 and then transmitted by the test server 115 via the internet 104 to any of one or more mobile calls servers 110a and fixed line servers 110b. In another example, a stored test scenario (or parameters thereof) may be retrieved from memory and transmitted to one or more mobile test units 108, mobile call servers 110a and fixed line call servers 110b. Various data and control communications also may occur between the test server 116 and the mobile test units 108 and call servers 110. Test results, call performance test results data, and other data gathered during testing may be transmitted via the internet 104 to the database 118. The database 118 may be accessed to correlate, analyze, report or otherwise process or output the stored data and test results.

In some embodiments a GPS receiver 115 may be coupled to or integrated with a mobile test unit 108 to obtain time and location data. Time and location data may be stored with the call performance test results data by the mobile test unit 108 for each call of a test scenario. For example, the time and location that a given mobile telephone device 114 transmits or receives a call may be stored (i.e., logged) by the mobile test unit 108 that is connected to the given mobile telephone device 114. The time, location, call performance test results data and other data pertaining to each call may be transmitted via the internet 104 to the database storage system 118. In addition, the mobile call servers 110 may also include a GPS receiver, which allows the mobile test unit(s) and the call server 110 to be time synchronized for starting and terminating calls. In addition, the GPS receiver allows the mobile call servers 110a to determine their location for each telephone call.

Although the test server 116 and the database 118 are shown as separate computer systems, in some embodiments a single computer system may embody both the test server and database. Further, in some embodiments a call server 110 may be integrated with the test server 116.

Test Setup

Figure 2:
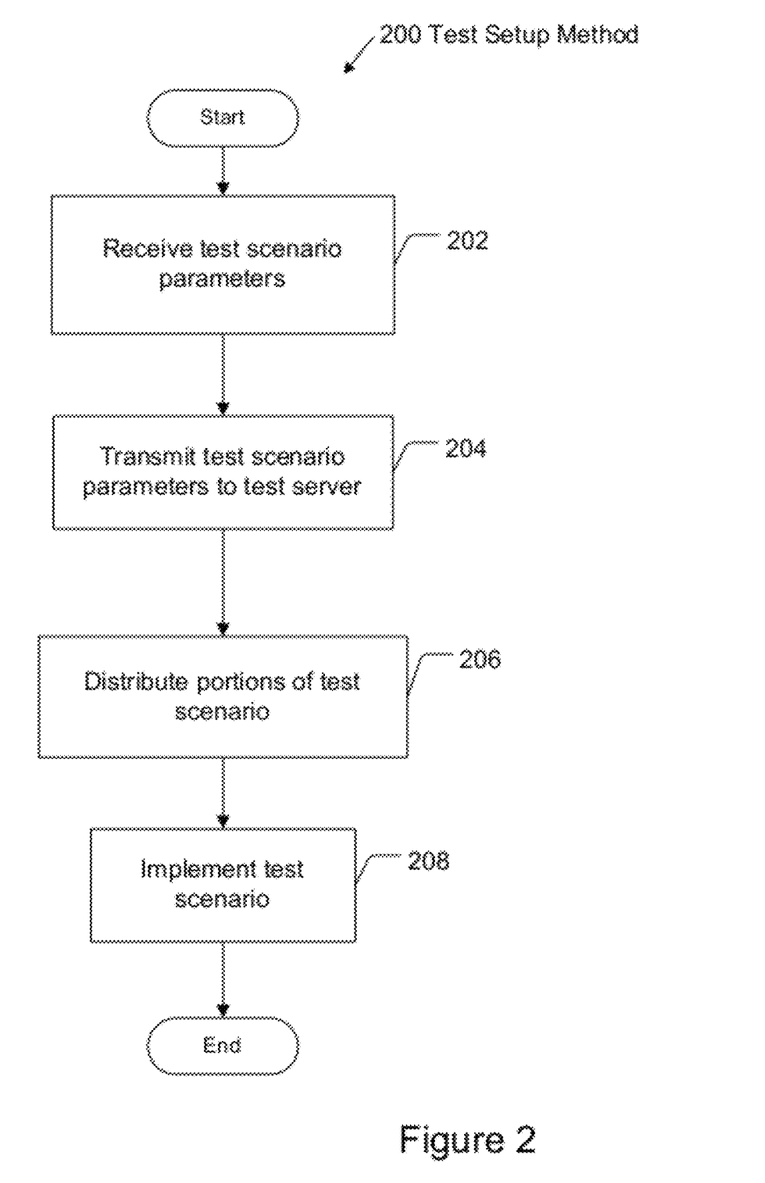
FIG. 2 is a flow chart of a method for setting up a call performance test scenario in accordance with an embodiment of the present invention.

FIG. 2 depicts a method 200 of setting up a call performance test according to an example embodiment of the present invention. Prior to implementing the test, a field technician or other user gathers a mobile test unit 108 and one or more mobile telephone devices 114 to be tested. The mobile telephone devices 114 support Bluetooth technology and communicate with the mobile test unit 108 via a wireless Bluetooth connection. The field technician may take the test device 108 and phones 114 into the field and perform a drive test, stationary test, or in-building test over a desired time period and at one or more desired locations. To setup the test, the field technician may design a test scenario for one or more mobile telephone devices 114. For example, at step 202, the mobile test unit 108 may receive from the field technician a set of test parameters via a user interface. The various test parameters may define or be otherwise used to generate a plurality of telephone calls (i.e., the call sequence). In an example embodiment, one parameter may be the number of calls a given mobile telephone device 214 is to place or receive. In addition, for each call of the test scenario there may be two telephone numbers that comprise parameters. For example, for each outgoing call one telephone number is the number that the mobile telephone device 114 is to dial (e.g., a call server 110) and the other number is that of the mobile telephone device 114 being tested. For each incoming call of the test scenario, a first telephone number is the number of the mobile telephone device 114 that is to receive the call and a second telephone number is that of the call server 110 to initiate the call. Another parameter for each call may be the duration that the call is to last. Another parameter may be the time that the call is to be initiated. Alternatively, a parameter may be the duration of time between successive calls (which allows the time that the each call is to be initiated to be derived). For example, the test parameter data may include data that dictates that a call in the call sequence of the test scenario is to be initiated every three minutes (after the first call).

At step 204, the mobile test unit 108 may transmit the test parameters of the test scenario to the test server 116, such as via the internet 104 and/or via a mobile telephone network. In some embodiments, the mobile test unit 108 may process the parameters to create the test scenario and subsequently transmit the test scenario to the test server 116. The test server 116 receives the test parameters and/or test scenario. In some embodiments, the test server 116 may process the test parameters to construct the test scenario. At step 206, the test server 116 transmits appropriate portions of the test scenario to one or more mobile call servers 110a and fixed line call servers 110b in accordance with the call server telephone numbers in the test scenario. For example, the test scenario may include a call sequence. For each call of the test scenario, data may be included such as a telephone number of the mobile telephone device 114 involved in the call, a telephone number of a call server 110/110b, the time the call is to be placed, the duration that the call is to last, and information indicating whether the mobile telephone device 114 is to initiate or receive the telephone call. For each call, the test server 116 may determine the call server 110 that participates as the second party initiating or answering the respective call. Accordingly, only portions of the test scenario may be applicable to a given call server 110. The test server 116 transmits only that portion of the test scenario applicable to a given call server 110/110b to each call server 110. In other embodiments, the entire test scenario may be transmitted to each call server 110 with each call server 110 processing the test scenario data to determine when to take action (e.g., to place calls). In some embodiments, the test server 116 also may transmit appropriate portions of the test scenario to the mobile test unit 108 as well. In other embodiments, the mobile test unit 108 may have generated the test scenario, and already have the information to be used for implementing the test scenario. The distributed test scenario may comprise an executable program and test parameter data and the receiving device may execute the received executable program which uses the test parameter data to implement the test scenario. Alternately, the distributed test scenario may comprise only test parameter data that an executable program resident on the receiving device uses during execution to implement the test scenario. At step 208, the mobile test unit 108 and call servers 110 implements the test scenario, such as (in the case of the mobile test unit 108) by commanding respective mobile telephone devices 114 to initiate and answer calls in accordance with the test scenario.

Test Method

Figure 3:
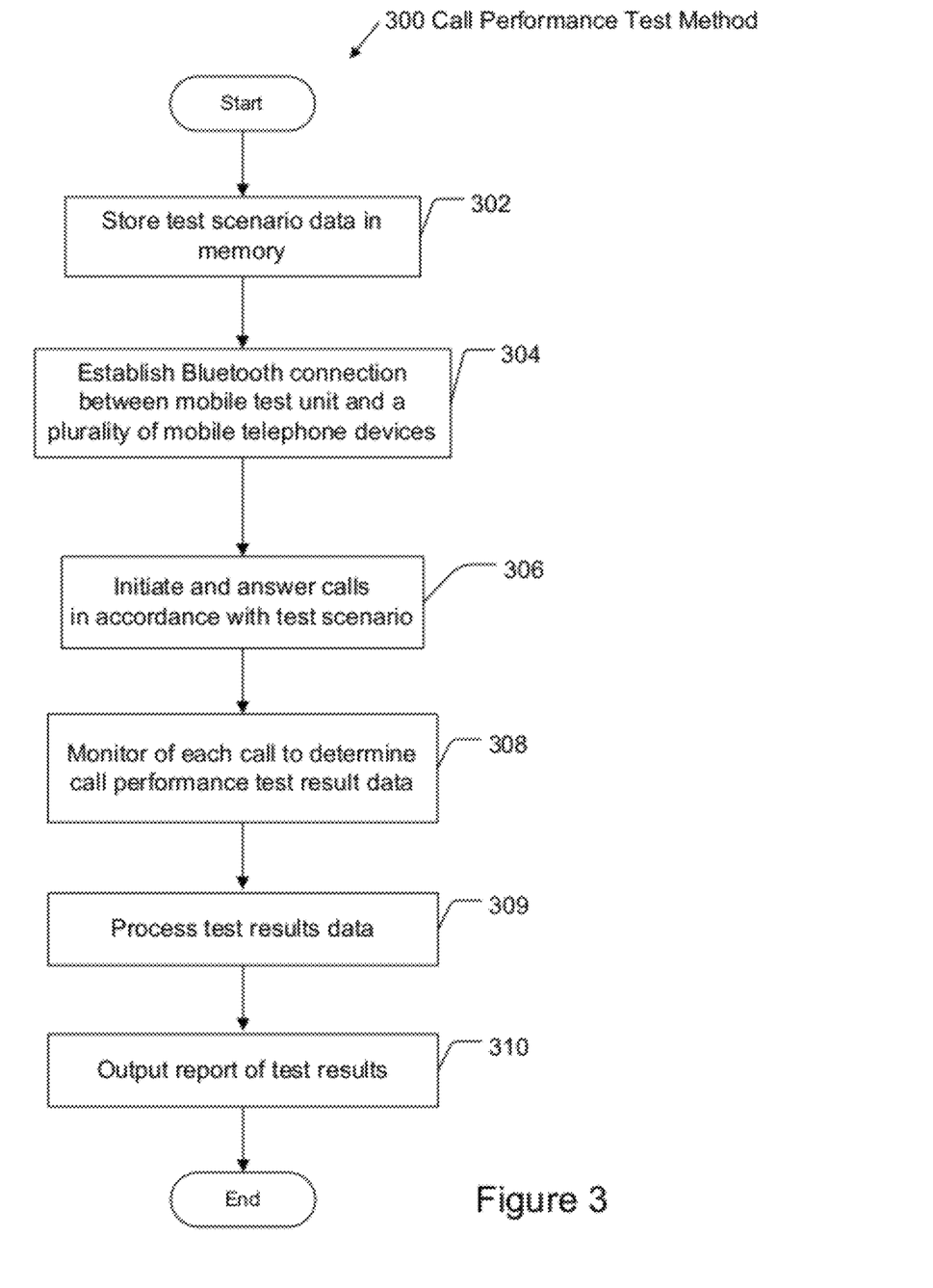
FIG. 3 is a flow chart of a method for testing mobile telephone call performance in accordance with an embodiment of the present invention.

FIG. 3 illustrates a process for performing a call performance test according to an example embodiment of the present invention. At step 302, the test parameters (for example as created in process 200) are stored in the memory of the mobile test unit 108 (and call servers 110). As discussed, the mobile test unit 108 (and call servers 110) may include executable program code that executes and performs the test scenario in accordance with the test parameters.

At step 304 a Bluetooth connection is established between the mobile test unit 108 and each of one or more mobile telephone devices 114 being tested. Such connections may be concurrent (including overlapping) or sequential, according to the test scenario being designed by the field technician. In this example, the mobile test unit is concurrently communicating with four mobile telephone devices as is illustrated in FIG. 1. The Bluetooth connections allow the mobile test unit 108 to control each given mobile telephone device 114. At step 306, throughout the test scenario the mobile test unit 108 communicates commands to each mobile telephone device 114 to place outgoing calls (and answer incoming calls) according to the test scenario parameters for a given test scenario (e.g., at the times and for the durations specified by the test scenario parameters). Similarly, the call servers 110*a*/110*b* initiate outgoing calls (and answer incoming calls) according to the test parameters for the test scenario (e.g., at the times and for the durations specified by the test parameters). However, rather than requiring a human to manually initiate each call to be placed or manually answer each incoming call, the mobile test unit 108 automates the process for a sequence of calls and facilitates testing of multiple mobile telephones concurrently.

At step 308, the mobile test unit 108 and call servers 110*a*/110*b* monitor each call to determine call performance test results data. Both the mobile test unit 108 and the call servers 110*a*/110*b*) may log (store) the device name and/or device id (e.g., device serial number and model serial number of the mobile telephone device involved in the call); the telephone number dialed or dialed from; the location at which the call was initiated (if the call was being made from a fixed call server 110*b* this information may be omitted by the fixed call server 110*b*); the time the telephone number was dialed (for the call initiating device); the time the call was answered (for the answering device); the location at which the call was answered (if the call was answered at a fixed call server 110*b* this information may be omitted by the fixed call server 110*b*); the time the call was terminated (i.e., went on-hook) or duration of call (from both the calling and answering device); the time that the call was scheduled to terminate (or scheduled duration); whether the call was answered; whether incoming speech was detected and/or was of sufficient voice quality, and the signal strength of the received signal (e.g., from the mobile telephone device and mobile call server 110).

Some of the logged data may comprise the test parameter data and need not be separately stored again for each call (for example, the number to be dialed) since it may already be stored in memory.

Each of the mobile test unit 108 and the call server 110 participating in a call may determine whether incoming speech is present. Thus, the mobile test unit 108 (through the mobile telephone under test) and the call server may each output recorded speech after the call is established. The call server 110 and mobile test unit 108 participating in the call may determine whether speech from the other device is being received. In some embodiments, the process for detecting whether speech is present may include the execution of a voice quality speech algorithm that detects whether incoming speech satisfies a predetermined voice quality threshold. For example, a mean opinion score may be assessed and stored. Additionally, detection of incoming audio may include determining whether any audio speech is being received, whether the speech is "breaking up," and/or whether the speech is overlaid with noise.

In some embodiments, the mobile test unit 108 also may monitor (via the Bluetooth connection) the battery life and signal strength of a given mobile telephone device 114 under test. For example, battery life may be monitored at various times, such as at the beginning and the end of a call and test scenario. Similarly, signal strength may be monitored at any time, such as at various times during a call and test scenario. Specific samples of the signal strength may be logged. Alternatively or in addition, the average signal strength for a call and test scenario may be computed and logged.

For either or both of the mobile telephone device incoming and outgoing calls, one of ordinary skill will appreciate that not all the values described above need be logged to perform a call performance test. For example, at the mobile test unit 108 the battery life and signal strength may be omitted in some scenarios. Further, one of ordinary skill will appreciate that other data also may be logged at the mobile test unit 108, the mobile call server 110*a* and/or the fixed line call server 110*b*.

The data logged by the mobile test unit 108, the mobile call server 110, and the fixed line call server 110*b* may be transmitted via the internet 104 (and/or mobile telephone network) to the test server 116 for processing and database 118 for storage. In various embodiments, the logged data may be correlated and processed at the mobile test unit 108, test server 116 or data storage system 118 to obtain test results. In some embodiments, the mobile test unit 108 may receive results from the call servers 110*a*/110*b* via the mobile telephone network for processing to thereby allow the field technician to immediately confirm that the test was performed satisfactory and to see the test results.

The test parameters and call performance test results data may be processed to provide call performance test results at 309. For example, from both devices participating in a call, the actual call duration may be compared to the scheduled call duration (or the time a call was scheduled to be terminated versus when the call was terminated) to determine if the call was dropped (terminated early) on either end. A call that is not terminated early would comprise a call that is successfully completed while a call terminated early (from either end) would comprise a call not successfully completed. Similarly, a difference between the time the call was initiated (as determined by the calling device) from the time that the call was answered (as determined by the answering device) to determine the call set-up time. In some instances, a call may not be completed (e.g., the answering device did not receive the scheduled call) which may be determined via processing to be an unsuccessful call initiation. Thus, the processing may provide tests results that include data of the number and/or percentage of successful calls, unsuccessful calls, successful initiations, and/or unsuccessful call initiations as well as the average and mean call set-up times.

At step 310, the test server 116 (or mobile test unit 108) may generate a report that may be displayed to the field technician and other personnel. As an example, for a given test scenario a report may include data (including the number and/or percentage) of the successful call initiations, successful call completions, average and/or mean call set up time, calls having two way speech, battery life (determined via Bluetooth protocol), and signal strength (determined via Bluetooth protocol). In addition, a report may show a log of the calls and call parameters included in the test scenario for a given mobile telephone device 114, along with the location and results for each call. In some embodiments reports of partial results may be displayed to the field technician at the mobile test unit 108 in near real time. For example, a portion of the test results obtained by the mobile test unit 108 and may be displayed to the field technician. A more complete report may be generated and displayed when the corresponding test results form the call servers 110 is obtained.

The results stored in the database 118 may be correlated and combined with data from many tests to obtain various call performance statistics (e.g., averages and means) for one or more mobile telephone devices, device models, device manufacturers, geographic areas, and/or carriers. One of ordinary skill will appreciate that other useful groupings of test results may be performed to provide beneficial information to end users, mobile telephone device manufacturers, carriers, and third party add-on manufacturers and providers. Examples of statistics that may be obtained from the test results include rate values, absolute values and/or percentages of various characteristics, parameters, and statistics, such as dropped calls, failed call initiations (outbound calls), failed call terminations (inbound calls), mean and average call set-up times (time between dialing and call established), time in no service, and calls not having two-way speech. One of ordinary skill will appreciate that other characteristics, parameters and statistics may be obtained. In addition, a large number of test units 108 may operate to perform testing of multiple mobile telephones. The test server 116 therefore may manage the testing by the call servers 110. Thus, instead of requiring a single call server (or group of call servers) with each test unit 108, the test server 108 allows for the efficient use of the call servers 110 to service many test units 108 (e.g., thousands). Thus, in some instances, the specific call server 100 is selected by the test server 116 upon receiving a test scenario from a mobile test unit 108 and wherein the test scenario identifies the type (and perhaps network and/or location) of call servers to be used during test. Upon selecting the call servers, information of the selected call servers 110 (e.g., the telephone numbers to be used during the test) may be transmitted to the test unit 108 and to the selected call servers 110.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of testing call performance of one or more mobile telephones, comprising:
   storing in a memory data for one or more test scenarios that each comprises a plurality of test parameters for attempting a plurality of telephone calls over a mobile telephone network;
   causing a first mobile telephone to establish a wireless connection with a test unit over a personal area network, distinct from the mobile telephone network;
   using the wireless connection over the personal area network, causing the test unit to command the first mobile telephone to attempt to establish a plurality of telephone calls, over the mobile telephone network to one or more answering devices, of the test scenarios in accordance with the test parameters;
   monitoring data of the plurality of telephone calls by the first mobile telephone including:
      data of first times at which telephone calls were dialed by the first mobile telephone;
      data of second times at which the telephone calls were terminated as reported wirelessly over the personal area network to the test unit by the first mobile telephone;
      data of third times at which the telephone calls were answered by the one or more answering devices as reported by the one or more answering devices; and
      data of fourth times at which the telephone calls were terminated as reported by the one or more answering devices;
   processing the monitored data of the plurality of telephone calls of the test scenario to evaluate call performance of the first mobile telephone, including whether the first mobile telephone dropped calls by comparing call durations, determined from the monitored data, to scheduled call durations of the telephone calls of the test scenarios; and
   outputting the call performance evaluation.

2. The method of claim 1, further including causing a second mobile telephone to attempt to establish a plurality of telephone calls, wherein at least some of the plurality of telephone calls of the first and second mobile telephones are established concurrently.

3. The method of claim 1, further comprising determining a set up time for at least some of the telephone calls by computing a time difference between when a telephone number for the telephone calls is dialed by the first mobile telephone and when the telephone call is answered as reported by the one or more answering devices.

4. The method of claim 1, further comprising collecting data of a location of the first mobile telephone during at least some of the telephone calls.

5. The method of claim 1, further comprising for each at least some of the plurality of telephone calls of the first mobile telephone, determining whether speech was present during the telephone call.

6. A method of testing call performance of one or more mobile telephones, comprising:
   storing in a memory data for one or more test scenarios that each comprises a plurality of test parameters for attempting a plurality of telephone calls over a mobile telephone network;
   causing a first mobile telephone to establish a wireless connection with a test unit over a personal area network, distinct from the mobile telephone network;
   using the wireless connection over the personal area network, causing the test unit to command the first mobile telephone to attempt to establish a plurality telephone calls, over the mobile telephone network to one or more answering devices, of the test scenarios in accordance with the test parameters;
   monitoring data of the plurality of telephone calls by the first mobile telephone including:
      data of first times at which telephone calls were dialed by the first mobile telephone;
      data of second times at which the telephone calls were terminated as reported wirelessly over the personal area network to the test unit by the first mobile telephone;
      data of third times at which the telephone calls were answered by the one or more answering devices as reported by the one or more answering devices; and
      data of fourth times at which the telephone calls were terminated as reported by the one or more answering devices;
   processing the monitored data of the plurality of telephone calls of the test scenario to evaluate call performance of the first mobile telephone, including whether the first mobile telephone dropped calls by determining a difference between the time the telephone calls were terminated and times the telephone calls were schedule to be terminated; and outputting the call performance evaluation.

7. The method of claim 6, further including causing a second mobile telephone to attempt to establish a plurality of telephone calls, wherein at least some of the plurality of telephone calls of the first and second mobile telephones are established concurrently.

8. The method of claim 6, further comprising determining a set up time for at least some of the telephone calls by computing a time difference between when a telephone number for the telephone calls is dialed by the first mobile telephone device and when the telephone call is answered as reported by the one or more answering devices.

9. The method of claim 6, further comprising collecting data of a location of the first mobile telephone during at least some of the telephone calls.

10. The method of claim 6, further comprising for each at least some of the plurality of telephone calls of the first mobile telephone, determining whether speech was present during the telephone call.

11. A method of testing call performance of a plurality of mobile telephones, comprising:

storing in a memory data for one or more test scenarios that each comprises a plurality of test parameters for attempting a plurality of telephone calls over a mobile telephone network to one or more answering devices;

monitoring data of the plurality of telephone calls associated with each of the plurality of mobile telephones when wireless connections are established between a test unit and the plurality of mobile telephone over a personal area network, distinct from the mobile telephone network;

wherein the data of the plurality of telephone calls comprises, for each telephone call, call data from each mobile telephone and call data from the one or more answering devices;

wherein the plurality of telephone calls are from the mobile telephone to the one or more answering device by wireless connections between the mobile telephones and the one or more answering devices over the mobile telephone network and are attempted in accordance with a test scenario that comprises an associated plurality of test parameters;

processing the call data from the mobile telephones and call data from the one or more answering devices to determine test results for the performance of the plurality of mobile telephone;

wherein the test results comprises data of dropped calls determined by comparing call durations, determined from the monitored data, to scheduled call durations of the telephone calls of the test scenarios; and outputting the test results.

12. The method of claim 11, wherein at least some of the plurality of telephone calls of the first and second mobile telephones are established concurrently.

13. The method of claim 11, further comprising determining a set up time for at least some of the telephone calls by computing a time difference between when a telephone number for the telephone calls is dialed by the first mobile telephone and when the telephone call is answered as reported by the one or more answering devices.

14. The method of claim 11, further comprising collecting data of a location of the first mobile telephone during at least some of the telephone calls.

15. The method of claim 11, further comprising for each at least some of the plurality of telephone calls of the first mobile telephone, determining whether speech was present during the telephone call.

16. A computer program product stored in one or more non-transitory tangible computer readable media having executable instructions to test call performance of a mobile device, comprising:

a code segment that runs on a test unit that enables the test unit to establish a wireless connection with a first mobile telephone over a personal area network and to cause the first mobile telephone to attempt to establish a plurality telephone calls, over a mobile telephone network, distinct from the personal area network, of one or more test scenarios in accordance with a plurality of test parameters;

a code segment to monitor data of the plurality of telephone calls by the first mobile telephone including:

data of first times at which telephone calls were dialed by the first mobile telephone;

data of second times at which the telephone calls were terminated as reported wirelessly over the personal area network to the test unit by the first mobile telephone;

data of third times at which the telephone calls were answered by an answering device as reported by the answering device; and data of fourth times at which the telephone calls were terminated as reported by the answering device;

a code segment to process the monitored data of the plurality of telephone calls of the test scenario to evaluate call performance of the first mobile telephone, including whether the first mobile telephone dropped calls by comparing call durations, determined from the monitored data, to scheduled call durations of the telephone calls of the test scenarios; and a code segment to output the call performance evaluation.

17. The computer program product of claim 16, wherein the code segment to cause the first and second mobile telephones to attempt to establish telephone calls causes at least some of the telephone calls to be established concurrently.

18. The computer program product of claim 16, wherein the code segment to process data further determines a set up time for at least some of the telephone calls by computing a time difference between when a telephone number for the telephone calls is dialed by the first mobile telephone and when the telephone call is answered as reported by the one or more answering devices.

19. The computer program product of claim 16, further comprising a code segment to collect data of a location of the first mobile telephone during at least some of the telephone calls.

20. The computer program product of claim 16, wherein the code segment to monitor data further determines whether speech was present during the telephone call.

* * * * *